Figure 1:
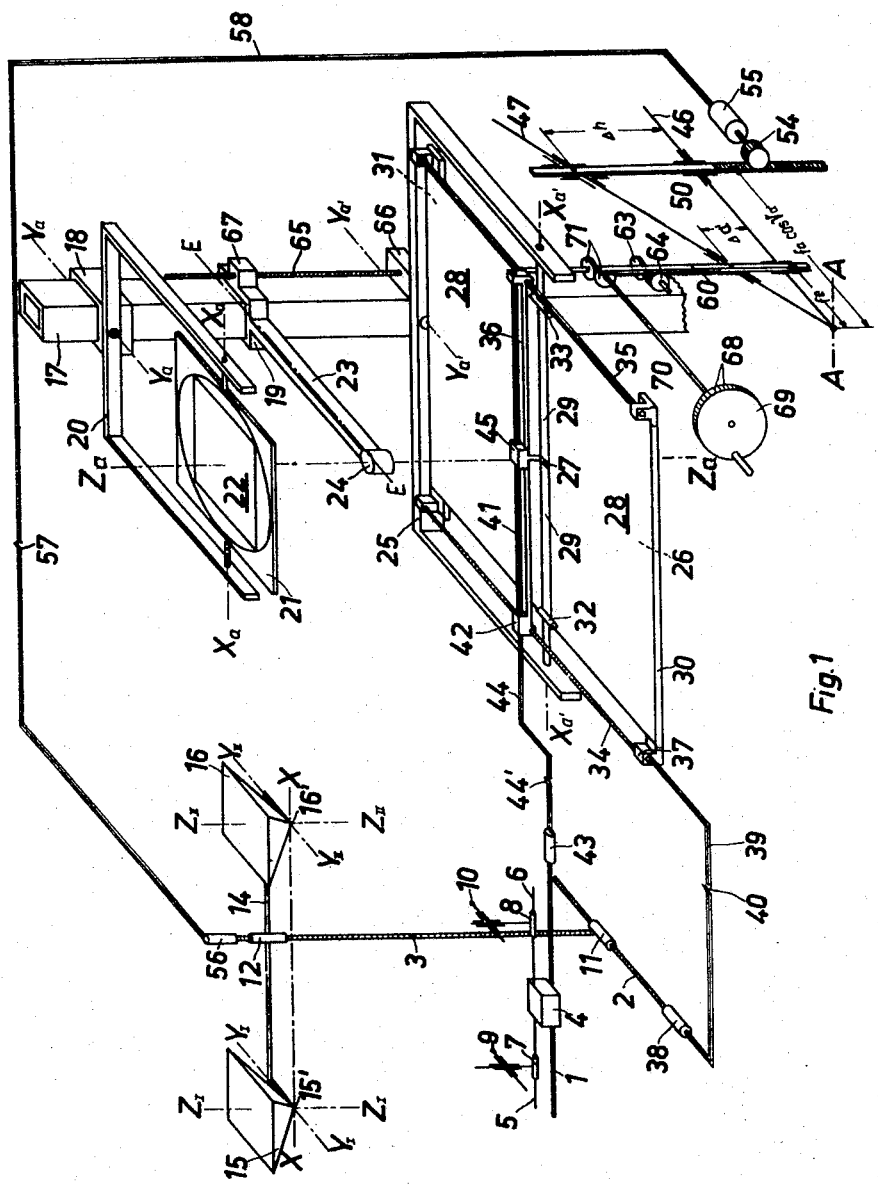

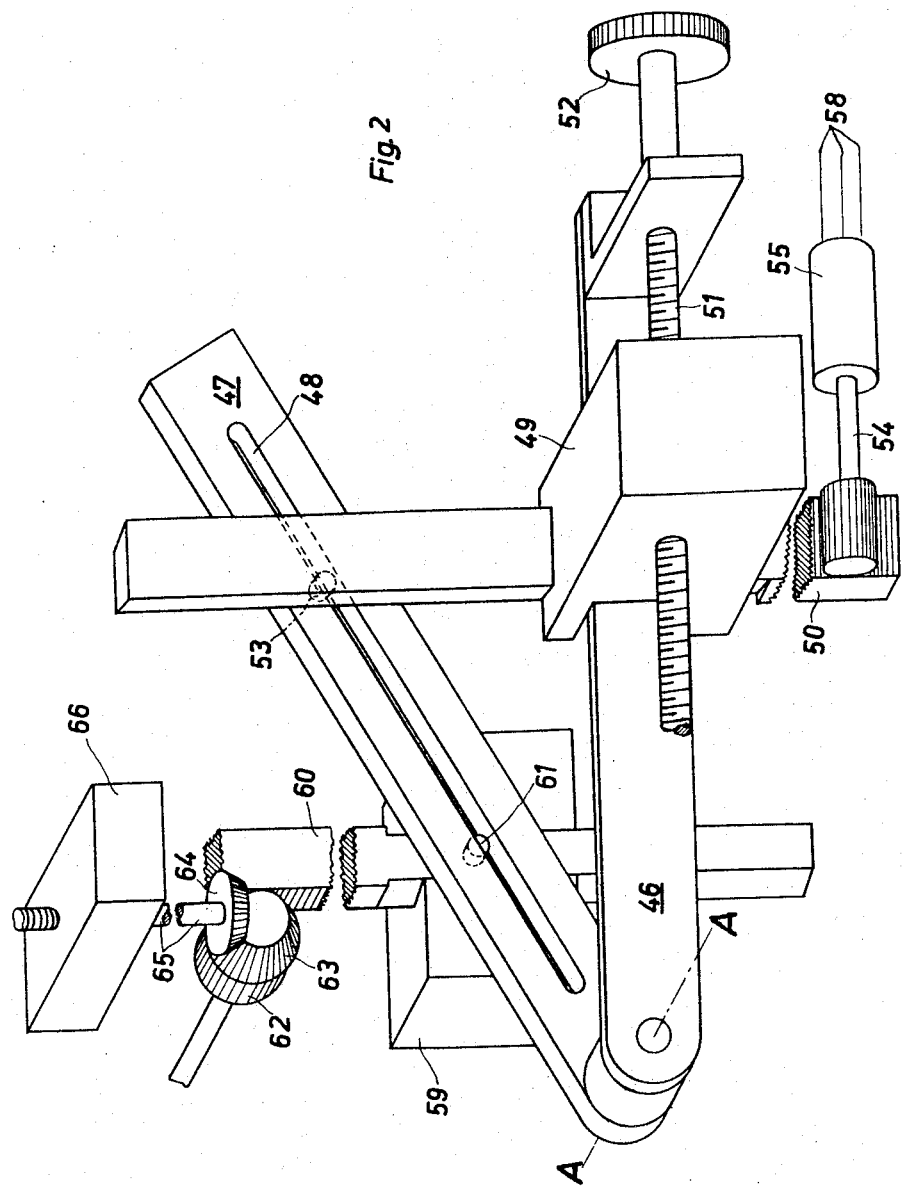

United States Patent Office 3,299,774
Patented Jan. 24, 1967

3,299,774
RECTIFIERS FOR DIFFERENTIAL STRIP-BY-STRIP RECTIFICATION OF AERIAL PHOTOGRAPHS
Horst Schoeler and Otto Weibrecht, Jena, Gera, Germany, assignors to VEB Carl Zeiss Jena, Jena, Gera, Germany
Filed May 21, 1964, Ser. No. 369,329
2 Claims. (Cl. 88—24)

This invention relates to a rectifier for differential strip-by-strip rectification of aerial photographs.

Aerophotographic plans are generally produced by rectifying the original negatives in a rectifier, scaling the rectified negatives to the same size, photographing the rectified projections and joining the positive paper prints. The errors of position to which central projection submits the various image points in the aerophotographic plan are considerably influenced not only by the camera angle but, in particular, by the differences of height in the landscape, which means that aerophotographic plans or maps prepared in the said manner fall far short of the required accuracy when broken country is concerned.

The rectification of aerial photographs of broken country by means of a rectifier is more or less conditional on a certain knowledge of the particularities of the relief surfaces of the ground. These relief surfaces and the respective sites can be easily determined in a stereoplotter by means of overlapping aerial photographs taken at various positions, so that rectification and an aerophotographic plan appear to be superfluous. Aerophotographic plans for many technical purposes in geology, agriculture, forestry and building, are however, superior to symbolistic maps because of the wealth of detail they offer. With a view therefore to creating sufficiently accurate aerophotographic plans or maps also of hilly and mountainous ground, stereoplotters acting on the Porro-Koppe principle and permitting rear projection of undistorted ray beams have been so constructed, or so coupled to commercial projection apparatus having projectors corresponding to those of the plotting apparatus, as to provide image plans free from influences of image inclination and height differences in the landscape. To make up for the consequently necessary transformation of the central-perspective aerial photograph to an orthographic one, the negatives placed into and oriented in the stereoplotter are scanned strip by strip, the profile of each strip is formed, and one of the oriented aerial photographs is differentially projected on a photographic layer by means of a slit. By displacing the slit relatively to the emulsion carrier along the profiles, parallel to the plane of projection, and by changing the distance apart of projection centre and emulsion carrier according to profiles, the image by and by rectified in detail and entirely is projected on the emulsion carrier. Determination of profiles and rectification can be effected at the same time or after each other by means of one or several apparatus.

The shortcomings of all the known devices for stripwise differential rectification of aerial photographs are due to the use of stereoplotters acting on the Porro-Koppe principle and consist in this, that for rectification in the plotting and projection apparatus every focal length of a photograph requires a projector of its own, that is to say a projection objective of the same focal length and the same angular objective.

It is an object of the present invention to provide a rectifier for differential strip-by-strip rectification of aerial photographs which, while making the greatest possible use of known instrumental possibilities, has a stereoplotter and a projection apparatus so coupled to each other that the projection distance in the projection apparatus can be continuously changed according to the profile determined in a stereoplotter, and which, without the necessity of a plurality of exchangeable projectors of different focal lengths corresponding to those of the taking cameras, is universally applicable to photographs of any focal lengths.

To this end the present invention consists in a rectifier for differential strip-by-strip rectification of aerial photographs wherein the projection apparatus is constructed as a rectifier and is connected to the stereoplotter by means of a mechanism which controls the projection distance in the rectifier according to the focal length of the aerial photograph, the rectification focal length, the inclination of projection table, and the height of profile.

The construction principle of the rectifier is only a secondary consideration and may at best be of some importance in the setup particularly of the control mechanism. For instance, in a rectifier built along the vertical and stationary optical axis, the inclination of the projection plane owing to its changeability can enter into the space occupied by the control mechanism, whereas in a rectifier extending along the vertical to the projection plane, which is not subject to inclinational changes, the inclination cannot enter into that space.

The rectifier according to the invention comprises known automatic controls for the vanishing point according to the perspectivity condition, for sharp definition according to Scheimpflug and for satisfying the lens equation. It is further adapted to rectify aerial images in dependency on adjusted magnitudes and accordingly has an image carrier rotatable about two axes and tiltable in its plane. The magnitudes to be adjusted are not calculated until the pair of images in the stereoplotter have been oriented with respect to each other and absolutely in regard of the there determined data of the outer orientation of the image to be rectified.

Advantageously the coupling is worked electrically by means of electric transmission channels having a communicator and a receiver, it being of utmost importance that the primary axis of the rectifier is correlated to the primary axis of the stereoplotter.

To avoid the coupling of rectifier and stereoplotter being restricted to only one definite plotter, it is convenient to rigidly connect the control mechanism to the rectifier, which also guarantees the simplest possible construction of the differential aerophotograph rectifier.

A simple mechanism for controlling the projection distance in the plotter is a device similar to a bevel protractor. This bevel protractor has a stationary leg and a leg rotatable by a driving means according to the profile heights determined in the stereoplotter. This driving means acts at right angles to the stationary leg and is from the axis of rotation of the bevel protractor at a distance depending on the focal length of the photograph and the inclination of the projection plane. The rotatable leg has a driver whose projection on the stationary leg is from the axis of rotation of the bevel protractor at a distance equal to the rectification focal length. The said control mechanism to the exclusion of special transmission gears can be so constructed as to deal with the magnification ratio of the model scale in the stereoplotter and the rectification scale in the rectifier.

In order that the invention may be more readily understood, reference is made to the accompanying drawings, which illustrate diagrammatically and by way of example one embodiment thereof, and in which FIG. 1 is a perspective view of a rectifier for differential strip-by-strip rectification of aerial photographs, restricted to such parts of the stereoplotter and the rectifier as are necessary for the proper understanding of the invention, and FIG. 2 is a magnified perspective view of a mechanical control mechanism.

In FIG. 1 a stereoplotter is shown essentially by means of three main spindles 1, 2 and 3 for displacements in the directions $x$, $y$ and $z$, respectively, which are required for measuring. The spindle 1 displaces a base slide 4 which carries spindles 5 and 6 engaging respectively slides 7 and 8 displaceable in $x$ direction. The slide 7 bears a measuring mark 9 for displacement in $y$ direction, and the slide 8 bears a measuring mark 10 for displacement in $z$ direction, the marks 9 and 10 serving for the adjustment of the respective base components. The spindle 2 displaces in $y$ direction a slide 11 to which is fixed the spindle 3 displacing a slide 12 in $z$ direction. The slide 12 holds two arms 13 and 14 in mutual prolongation. The free ends of the arms 13 and 14 are angled to carry respectively projection cameras 15 and 16 which have projection centres 15' and 16' and receive the photograms. The projection camera 15 is tiltable about two axes $X$—$X$ and $Y_I$—$Y_I$ at right angles to each other. The photogram introduced in the camera 15 can swing about an axis $Z_I$—$Z_I$. The camera 16 is tiltable about the axis $X$—$X$ and an axis $Y_{II}$—$Y_{II}$ which is at right angles thereto and parallel to the axis $Y_I$—$Y_I$. The photogram introduced in the camera 16 can swing about an axis $Z_{II}$—$Z_{II}$. The guides of the slides and the means for driving the spindles are omitted in the drawing for the sake of clearness.

When viewing the oriented photograms stereoscopically by means of an optical system (not shown), these photograms merge in a stereoscopic image, and the measuring marks 9 and 10 in the optical system merge in a spatial mark which by displacement of the base slide 4 in $x$ direction, the slide 11 in $y$ direction and the slide 12 in $z$ direction can be adjusted to any point in the spatial model.

A rectifier constructed along the vertical optical axis has a stationary column 17 on which two slide-blocks 18 and 19 are disposed above one another for displacement with an intervening distance $a$ corresponding to the lens equation. The slide-block 18 holds a frame 20 which can be inclined about an axis $Y_a$—$Y_a$ and in which an image carrier 21 can be inclined about an axis $X_a$—$X_a$, the emulsion side of the carrier 21 lying in the image plane. On the image carrier 21 a photogram 22 can be tilted about an axis $Z_a$—$Z_a$ which coincides with the optical axis when the image carrier 21 is horizontal. The axes $X_a$—$X_a$, $Y_a$—$Y_a$ and $Z_a$—$Z_a$ correspond to the axes $X$—$X$, $Y_I$—$Y_I$ and $Z_I$—$Z_I$, and the photogram 22 is equal to the photogram placed in the projection camera 15. The slide-block 19 has an arm 23 carrying an objective 24 the principal planes of which coincide with each other and are indicated in the drawing by a dot-and-dash line E—E.

At a distance (1) $$a' = a_{0'} + \Delta a'$$

which extends from the principal plane E—E of the objective downward and depends on the rectification focal length $f_e$, the focal length $f_a$ of the photograph, the height $h$ of the projection centre above the ground plane containing a point of minor control, as well as on the inclinations $\nu_e$ and $\nu_{a'}$ of the image plane and the projection plane in the principal section, the column 17 holds a frame 25 inclinable about an axis $Y_{a'}$—$Y_{a'}$ parallel to the axis $Y_a$—$Y_a$. In the frame 25 a projection table 26 is inclinable about an axis $X_{a'}$—$X_{a'}$, at right angles to the axis $Y_{a'}$—$Y_{a'}$. The upper surface of the table 26 is the projection plane and is entriely protected from photographically active exposure by two blinds 28 and 29 which are at right angles to each other and form a slit 27. The blinds 28 and 29 have at their ends rolls 30, 31 and 32, 33, respectively, the rolls 30, 31 of the blind 28 being fixed to the projection table 26, and the rolls 32, 33 of the blind 29 being fixed to the blind 28. The rolls 30 to 33 are exposed to the tension of coil springs (not shown) imparting to them the tendency to unroll the blinds 28 and 29.

At two sides of the projection table 26 are provided respectively a spindle 34 and a guide 35 for driving and guiding a slide 36 over the projection table 26, the spindle 34 and the guide 35 being parallel to each other and to the axis $Y_{a'}$—$Y_{a'}$. The spindle 34 is rotatable by a communicator 37 connected through an electric wire 39 to a receiver 38. The current in the wire 39 can be broken by a switch 40. By rotation of the spindle 34, corresponding to that of spindle 2, the slide 36 is displaced in the direction of the axis $Y_{a'}$—$Y_{a'}$, according to the displacement of the slide 11 in the stereoplotter. On the slide 36 is mounted a spindle 41 which over a communicator 42, an electric wire 44 and a receiver 43 is connected to the spindle 1 of the stereoplotter and displaces a nut 45 parallel to the axis $X_{a'}$—$X_{a'}$, according to the displacement of the base slide 4. The electric wire contains a switch 44'. The nut 45 is fast with the slit-forming parts of the blinds 28 and 29 and controls the displacement of the slit 27 in two directions which are at right angles to each other and parallel to the plane of the projection table 26, displacements of the slit 27 corresponding to displacements in the $x$ and $y$ directions in the stereoplotter.

To the column 17 of the rectifier is assumed to be rigidly connected a leg 46 of a bevel protractor the other leg 47 of which is rotatable about an axis A—A and has a slit-guide 48 (FIG. 2). Along the stationary leg 46, a bearing body 49 for a rod in the form of a rack 50 is displaceable, and adjustable at a fixed distance from the axis A—A, by means of a spindle 51. The spindle 51 is connected to the stationary leg 46 and rotatable by a handwheel 52 keyed to it. At the upper end of the rack 50 is a driver 53 engaging the slit-guide 48. The rack 50 is displaceable by means of a pinion 54. The pinion 54 is actuated by a receiver 55, a transmission channel 58, a communicator 56 and the spindle 3 of the stereoplotter, the channel 58 being interrupted by a switch 57.

In a stationary bearing body 59 is mounted a rod constituting a rack 60 which has a driver 61 sliding in the slit guide 48 and which through a pinion 62 and a pair of bevel gears 63, 64 actuates a spindle 65 parallel to the column 17. The bevel gear 63 is rigidly connected to and disengageable together with the pinion 62. The spindle 65 rests in a bearing 66 (FIG. 1) fast with the column 17 and is in mesh with a nut 67 fast with the slide-block 19. The drivers 53, 61 and the slit guide 48 of the leg 47 are such that displacement of the bearing body 49 along the leg 46 can take place without self-locking.

The spindle 65 can be influenced also by a handwheel 69 (FIG. 1), a shaft 70 and a pair of bevel gears 71. The handwheel 69 has a scale 68. This arrangement is for the adjustment of the $a'_0$ value, which is calculated for a definite minor-control point at a known distance from the projection centre of the stereoplotter, the said minor-control point being the reference point for the adjustment of the magnification.

When the photograms in the projection cameras 15 and 16 of the stereoplotter are oriented relatively and absolutely, and the respective orientation components for the rectifier and the distances $a$ and $a'_0$ are calculated and adjusted at the rectifier, and the slit 27 is so adjusted that the said minor-control point can be projected on the projection table 26, and the two legs 46 and 47 are parallel in the zero position corresponding to the minor-control point, then the switches 40, 44' and 57 can be closed and the pinion 62 and the bevel gear 63 can be engaged to mesh respectively with the rack 60 and the bevel gear 64.

When, now, the photograms are scanned by means of the stereoplotter strip by strip for determining the profiles, the slit 27 is displaced according to the rotations of the spindles 1 and 2. The rotations of the spindle 3, which correspond to the differences $\Delta h$ of the altitudes in the landscape, are transmitted by the pinion 54, the rack 50 and the driver 53 to the leg 47. The leg 47 is rotated about the axis A—A a corresponding amount away from zero position and on its part displaces the rack 60 by means of the driver 61. The rack 60 through the pinion 62, the bevel gears 63, 64, the spindle 65 and the nut 67 displaces the slide block 19 an amount $\Delta a'$, which corresponds to the deviations $\Delta h$ of the landscape altitudes from the minor-control point. The values $\Delta a'$ and $\Delta h$ in the plotter are linked to each other by the relation (2) $$\Delta a' = \frac{f_e}{f_a \cos \nu_{a'}} \cdot \Delta h$$

which the above-described control carries into practice when the distance apart of the driver 53 and the stationary leg 46 is $\Delta h$, and the distance apart of the projection of the driver 53 on the stationary leg 46 and the axis A—A is $f_h \cdot \cos \nu_{a'}$ and the distance apart of the projection of the driver 61 on the stationary leg 46 and the axis A—A is $f_e$, and the distance apart of the driver 61 and the stationary leg 46 is $\Delta a'$.

Instead of the above-described mechanical control of the projection distance in the plotter, a corresponding electric or electro-mechanical control can be used to the same effect.

Without departing from the spirit of the invention, it is possible to use, instead of the above-described rectifier constructed along the optical axis, a construction along the vertical to the projection plane or along the vertical to the image plane or along the metapole ray. In a rectifier along the vertical to the projection plane, the image plane and the projection objective are tiltable. A rectifier along the vertical to the image plane offers the advantage of an inclinable projection plane and an inclinable projection objective. In a construction along the metapole ray there is inclinable the image plane, the projection plane and the projection objective.

We claim:

1. A rectifier for differential strip-by-strip rectification of aerial photographs, comprising at least one column, a projection system connected to said column and consisting of an image plane, a projection objective and a projection plane, at least two of said parts of said projection system being displaceable relatively to each other along said column and inclinable to each other about two axes at right angles to each other, one of said axes of said two parts being at right angles to said column, first means for displacing said two parts, two blinds parallel to said projection plane and in close vicinity thereto, the one of said blinds being fixed to a projection table and extending parallel to said one axis and at right angles to said column and forming a first slit extending at right angles to said one axis, the other of said blinds being fixed to said one blind and covering said first slit and forming a second slit parallel to said one axis, a system of cross-slides for displacing said second slit parallel to said projection table and parallel and at right angles to said one axis, a bevel protractor, the one leg of said bevel protractor being stationary, the other leg of said bevel protractor being mounted on the said one leg for rotation about an axis at right angles thereto, a first rod at right angles to and engaging said one leg, said first rod being displaceable on said one leg at a distance from the axis of rotation of said other leg, said distance depending on the photographic focal length and the image inclination, a second rod parallel to said first rod, said second rod being displaceable along said one leg at a distance equal to the rectification focal length and being connected to said other leg, second means for transmitting the horizontal displacements from said stereoplotter to said system of cross-slides, and third means for transmitting vertical displacement from a stereoplotter to said first rod, said second rod acting on said first means.

2. A rectifier for differential strip-by-strip rectification of aerial photographs, comprising at least one column, a projection system connected to said column and consisting of an image plane, a projection objective and a projection plane, at least two of said parts of said projection system being displaceable relatively to each other along said column and inclinable to each other about two axes at right angles to each other, one of said axes of said two parts being at right angles to said column, first means for displacing said two parts, two blinds parallel to said projection plane and in close vicinity thereto, the one of said blinds being fixed to a projection table and extending parallel to said one axis and at right angles to said column and forming a first slit extending at right angles to said one axis, the other of said blinds being fixed to said one blind and covering said first slit and forming a second slit parallel to said one axis, a system of cross-slides for displacing said second slit parallel to said projection table and parallel and at right angles to said one axis, a bevel protractor, the one leg of said bevel protractor being fast with said column, the other leg of said bevel protractor being mounted on the said one leg for rotation about an axis at right angles thereto, a first rod at right angles to and engaging said one leg, said first rod being displaceable on said one leg at a distance from the axis of rotation of said other leg, said distance depending on the photographic focal length and the image inclination, a second rod parallel to said first rod, said second rod being displaceable along said one leg at a distance equal to the rectification focal length and being connected to said other leg, second means for transmitting the horizontal displacements from said stereoplotter to said system of cross-slides, third means for transmitting vertical displacement from a stereoplotter to said first rod, and adjusting means, said second rod and said adjusting means being in engagement with said first means.

References Cited by the Examiner

UNITED STATES PATENTS 2,059,633   11/1936   Ferber _____ 88—24

NORTON ANSHER, *Primary Examiner.*

R. A. WINTERCORN, *Assistant Examiner.*